Aug. 6, 1940.  W. N. HALLANGER  2,210,535
CONNECTION CONSTRUCTION
Filed Dec. 20, 1937  2 Sheets-Sheet 1

INVENTOR
William N. Hallanger

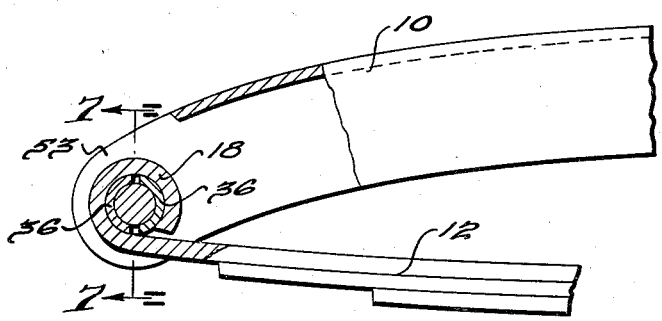
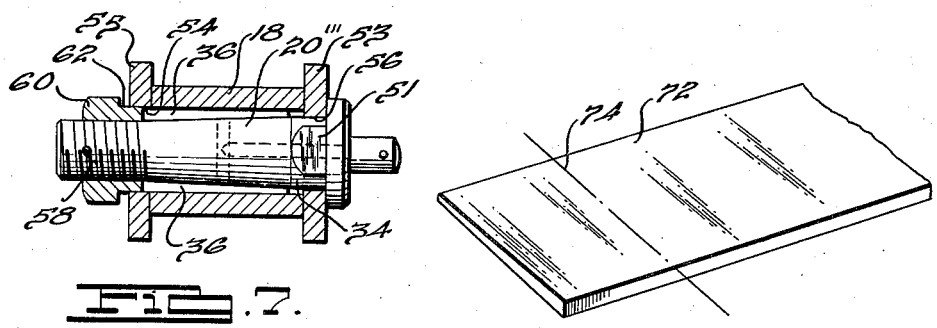
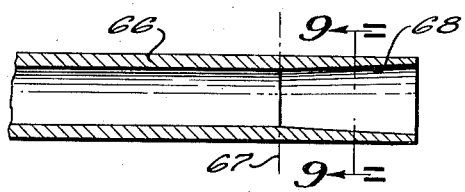
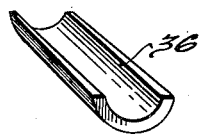
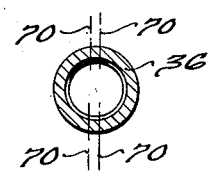

Patented Aug. 6, 1940

2,210,535

UNITED STATES PATENT OFFICE 2,210,535

CONNECTION CONSTRUCTION

William N. Hallanger, Detroit, Mich.

Application December 20, 1937, Serial No. 180,722

5 Claims. (Cl. 267—54)

The present invention relates to connection construction; and particularly relates to connections between members which are pivotally and movably mounted relative to each other. The construction of the present invention has a variety of uses, one of the principal uses being for shackle constructions for pivotally mounting one end of a leaf spring to the frame of the vehicle. Another use is a construction in which a leaf spring is connected directly to the vehicle frame; and another use is in the steering connection of a vehicle. Still other uses will become apparent to those skilled in the art from the following description.

One of the primary objects of the present invention is to provide an improved connection between relatively movable members of such a construction that looseness in the joint is prevented.

A further object of the present invention is to provide a split bushing which cooperates with a pivot pin member having tapered pivot portions and which is tapered and adjustable relative thereto, so that wear occasioned in use may be readily taken up.

A further object of the invention is to provide an improved shackle connection of rugged construction which may be readily assembled and which is adjustable to take up wear.

Another object of the present invention is to provide an improved connection which may be easily assembled in a relatively short time, thus reducing the labor cost of assembly and adjustment.

A further object of the present invention is to provide an improved shackle construction which is economical to manufacture.

Other objects of the present invention will become apparent from the following specification, the drawings relating thereto, and from the claims hereinafter set forth.

In the drawings, in which like references are used to designate like parts in the several views throughout:

Fig. 6 is a view similar to Fig. 1, of a modified form of the present invention;

Fig. 7 is a cross sectional view taken substantially along the line 7—7 of Fig. 6;

Fig. 8 is a fragmentary longitudinal cross sectional view of a tubular stock illustrating one manner in which the bushings may be made;

Fig. 9 is a cross sectional view taken substantially along the line 9—9 of Fig. 8;

Fig. 10 is a fragmentary perspective view of a strip of rolled stock, illustrating another manner by which the bushings may be made; and, Fig. 11 is a perspective view of one of the bushing halves in its completed form.

Figure 1:
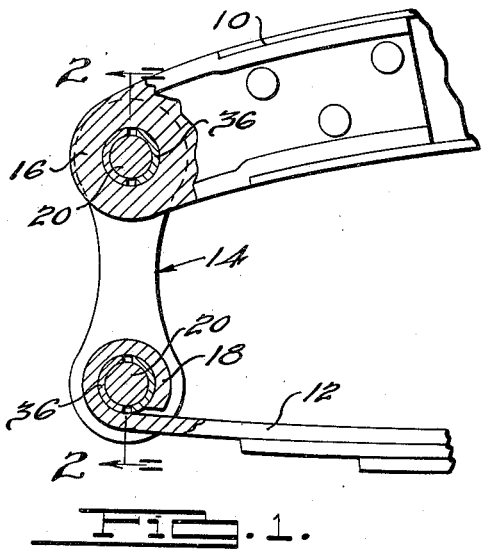
Figure 1 is a fragmentary side elevational view partly in cross section, of a shackle connection embodying features of the present invention.

Referring to the drawings, and referring particularly to Figs. 1 to 4, the invention is illustrated in connection with spring shackle constructions in which a portion of the frame 10 of an automative vehicle is shackled to a leaf spring 12 by means of a shackle connection generally indicated at 14. The frame 10 has a transversely extending integral tubular member 16 which is substantially parallel to a transversely extending integral tubular member 18 forming the spring eye of the leaf spring 12.

The shackle connection 14 includes substantially parallel pivot portions in the form of similar bolts 20. Each bolt 20 has a threaded outer end 22 and has a substantially frusto-conical or tapered smooth bearing surface portion 24. By way of example, a taper of .0060 to .0065 inches per inch has been found practical and gives satisfactory results. Each bolt 20 also has a head 26 adjacent the end opposite to the threaded end with a knurled portion 28 adjacent the head 26. The bolts 20 are adapted to be connected together by means of a plate member 30 having openings 32 therethrough, through which the bolts 20 extend. The knurled portions 28 are adapted to be pressed into the openings 32 so that the bolts 20 are fixed relative to the plate member 30. In order to provide for adjustment, as will be more apparent from the later description, the portions of the bearing surfaces of the bolts 20 adjacent their fixed ends for a slight distance from their fixed ends, as indicated at 34, are made substantially straight, or are substantially cylindrical as compared with the frusto-conical bearing portions 24. By way of example, it has been found in practice that the width of this flat portion can be three-sixteenths ($\frac{3}{16}$) of an inch to give satisfactory results.

The shackle bolts 20 are adapted to extend through substantially cylindrical openings in the members 16 and 18; and bushings 36 are interfacing edges at each side is sufficient to give proper results. The divided bushings 36 have substantially cylindrical outer surfaces and have tapered inner bearing surfaces which are tapered complementary to the tapered portions 24 of the bolts 20. The members 18 and 16 are preferably of substantially the same width; and the bushings 36 are also of a length substantially the same as the width of the members 16 and 18.

In assembly, one end of the bushings 36 extends outwardly beyond the adjacent side edges of the members 16 and 18; and a plate member 38 similar to the plate member 30 is adapted to be received over the threaded ends 22 of the bolts 20. Nuts 40 are provided which are threadably received over the threaded ends; and upon tightening the nuts 40 the plate member 38 engages the exposed ends of the bushings 36 and radially outwardly and securely and tightly hold the parts against rattling. As wear occurs, further tightening of the nuts 40 will take up this urges them inwardly along the tapered portion of the bolts 20. The bushings 36, due to their tapered inner bearing surfaces, are thus urged posed between the members 16 and 18, respectively, and the bolts 20. According to the present invention, the bushings 36 are split or divided longitudinally thereof so that normally there is a slight distance between the facing edges of the parts forming each of the bushings 36 to allow for adjustment. It has been found that one-sixteenth ($\frac{1}{16}$) of an inch clearance between the wear, as is evident from the above description, and the leading edges of the bushing 36 will extend over the straight portion 34 of the bolt 20.

The bearing surfaces 24 of the bolts 20 are preferably finished smooth so that there will be relative rotative movement between the bolts 20 and the bushings 36. The bushings 36 ordinarily will be prevented from rotating due to the frictional engagement between the outer surfaces of the bushings 36 with their respective members 16 and 18. There may be slight movement between the bushings 36 and the outer members 16 and 17; but such movement will not cause squeaks as the lubricant will work through the clearance spaces between the bushing halves over onto the outer surfaces of the bushing halves. The substantially straight portions 34 adjacent the fixed ends of the bolts 20 permit the adjustment to take up wear as the wear occurs and as the bushing 36 is urged toward the fixed ends of the bolts 20. The bushings 36 are relatively inexpensive to manufacture as they may be formed from rolled strip steel which may be formed into shape to provide the divided bushings 36.

In order to provide for lubricating the bearings, the bolts 20 are internally bored longitudinally thereof, as indicated at 42, the bore 42 communicating with a transverse bore 44. Lubricant may thus be forced into the bore 42 through a grease fitting 46 and be transmitted to the bearing surfaces through the transverse bore 44. In the embodiment illustrated in Fig. 2, the bore 42 extends preferably from the head end of the bolt member 20.

Figure 2:
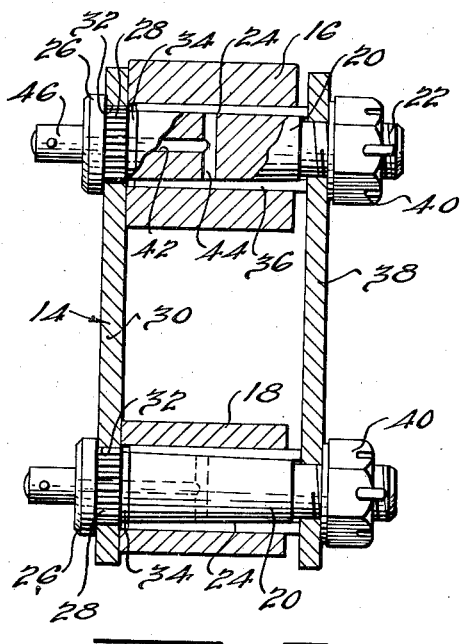
Fig. 2 is a cross-section view with parts in elevation taken substantially along line 2—2 of Fig. 1.
Figure 3:
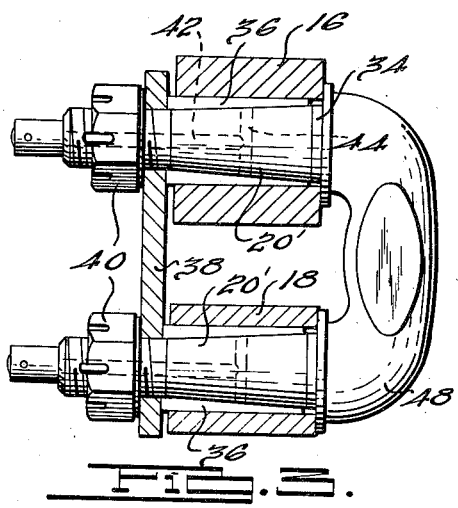
Fig. 3 is a view similar to Fig. 2 illustrating a modified form of the present invention.

In the embodiment illustrated in Fig. 3, the U-bolt structure is formed by forming the bolts 20' with an integral base portion 48. Such a U-bolt structure may be formed by drop forging the bolt portion 20' integrally with the base portion 48. In this embodiment the grease conduits 42 are formed from the thread ends of bolt members 20' rather than from the head ends as illustrated in Fig. 2.

Figure 5:
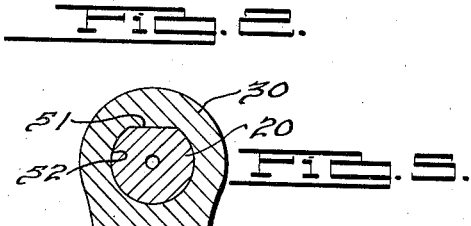
Fig. 5 is a fragmentary cross sectional view taken substantially along the line 5—5 of Fig. 4.
Figure 4:
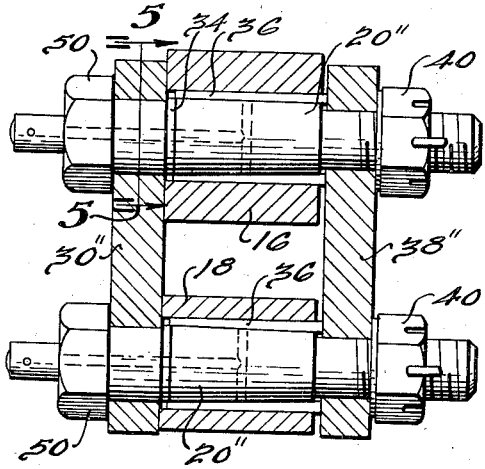
Fig. 4 is another view similar to Fig. 2 illustrating another modified form of the present invention.

In the embodiment illustrated in Figs. 4 and 5, the U-bolt structure is formed from the two bolts 20" and a plate member 30" as in the embodiment illustrated in Fig. 2, except that in the embodiment illustrated in Fig. 4 the knurled portion 32 on the bolts 20 of Fig. 2 is dispensed with and hex heads 50 are provided on the ends of the bolts 20". In order to prevent rotation of the bolts 20" relative to the plate member 30", the bolts 20" are flattened at 51 adjacent the heads 50; and openings 52, of a shape complementary to the sectional shape of the bolts 20", are provided through the plate member 30". Plate members 30" and 38" correspond to the plate members 30 and 38, respectively, in the embodiment described in connection with Fig. 2.

Referring to Figs. 6 and 7, a modified embodiment of the present invention is illustrated in which the spring eye 18 of the leaf spring 12 is connected directly to the vehicle frame 10. The vehicle frame 10 includes spaced, substantially parallel, integral plate members 55 and 53 having aligned openings 54 and 56 respectively. The eye 18 which is generally tubular in shape, of the leaf spring 12, is adapted to be interposed between the plate members 55 and 53; and the space between the plate members 55 and 53 is substantially equal to the width of the spring eye 18. The tapered bolt 20''' is adapted to extend through the openings 54 and 56 and through the spring eye 18; and the split bushings 36 are adapted to be positioned between the bolt 20''' and the inner surface of the spring eye 18. The bolt 20''' is flattened at 51 as in the embodiment shown in Figs. 4 and 5, and the opening 56 is of complementary shape for receiving the bolt therein so that the bolt will not turn in the opening.

One end of the bolt 20''' is threaded, as indicated at 58, and extends through and beyond the opening 54. A nut 60, having a reduced, substantially circular portion 62 is adapted to be threadably received over the threaded end 58 and extends within the opening 54. The opening 54 is preferably of the same diameter as the diameter of the opening through the spring eye; and the diameter of the circular portion 62 is preferably substantially the same so that it may be relatively tightly received within the opening 54.

When the parts are first assembled, the split bushings 36 extend slightly through the opening 54 and are engaged by the inner face of the circular portion 62. To take up wear in the connection merely turning the nut 60 causes the tapered bushings 36 to ride upon and move longitudinally of the tapered bolt 20. It is, of course, understood that a lock nut may be also threadably received over the threaded end 58 for preventing displacement of the nut 60, or the nut and bolt provided with means for reception of a cotter key.

While the connection is described above in relation to connections for connecting leaf springs to vehicle frames, it will, of course, be evident to those skilled in the art that the connection has other uses. One such use is in the steering connection for automotive vehicles.

One manner in which the split bushing 36 may be formed is illustrated in Figs. 8 and 9, in which a length of tubular stock 66 is shown, having an initial internal diameter substantially equal to the final smallest internal diameter of the tapered bushing. The tubular stock 66 is then reamed to provide a taper 68 for the length of one bushing; and the stock is then cut along the line 67 to provide one bushing. The severed bushing may then be cut longitudinally along line 70 in order to provide the split tapered bushing and to provide the clearance between the split halves so as to adapt the bushing for the adjustments described. The space between the lines 70 is preferably about one-sixteenth (1/16) of an inch and this amount may be removed by selecting a saw blade or cutter of corresponding width.

In Figs. 10 and 11 another method of forming the split bushings is illustrated, in which a strip of rolled stock 72 is provided, which has one surface tapered to provide the internal taper on the tapered bushing. The rolled stock 72 may then be cut into proper lengths along the lines 74 to provide one bearing half. This severed portion may then be pressed to the shape illustrated in Fig. 11 to provide one of the split bearing halves 36. Other conventional methods of forming the bushings may be used.

In all of the embodiments illustrated, the bearing portions of the bolt members are tapered and the divided tapered bushings are provided in the same association relative to each other so that wear in the structure may be taken up as it occurs.

Formal changes may be made in the specific embodiments of the invention described without departing from the spirit and substance of the invention, the scope of which is commensurate with the appended claims.

What is claimed is:

1. A shackle connection comprising a pair of members having substantially parallel tubular openings therethrough, a pair of shackle bolts disposed to enter said members respectively, said bolts being tapered longitudinally thereof and having substantially cylindrical portions adjacent the large ends of the tapered portions, a member connecting said shackle bolts adjacent the cylindrical portions leaving the cylindrical portions exposed, bushing members separated along diametrically opposed longitudinal lines disposed between said tubular openings and said bolts, said bushing members having their inner bearing surfaces tapered longitudinally thereof complementary to the taper of the bolts, and means for adjusting the bushing members along the bolts.

2. In a pivot connection of the class described, the combination of a member having a cylindrical opening therethrough, a pivot pin received therein having a tapered portion, said pin having a cylindrical portion adjoining the large end of the tapered portions, said cylindrical portion being of less diameter than the inner diameter of said cylindrical opening leaving a space therebetween, a pair of curved bushing members adapted to take up the clearance between the tapered portion of said pin and said cylindrical opening and having cylindrical outer surfaces adapted to fit the inner surface of said cylindrical opening and having tapered inner surfaces adapted to fit the tapered portion of said pin, said bushing members being initially positioned with their leading ends removed from the cylindrical portion of said pin, and means for forcing said bushing members upwardly on said tapered pin and over said cylindrical portion for taking up clearance between said cylindrical opening and said pin to thereby compensate for wear.

3. A shackle construction comprising a pair of members having substantially parallel tubular openings therethrough, a pair of shackle bolts disposed to enter said members respectively, said bolts being substantially circular in cross-section and being tapered longitudinally thereof, a member connecting said shackle bolts adjacent one end thereof, a pair of complementary bushing members spaced from each other longitudinally thereof at substantially diametrically opposed points for each bolt, said bushing members being disposed between said tubular openings and said bolts and having their inner bearing surfaces tapered longitudinally thereof complementary to the taper of the bolts, and means for adjusting the bushings along the bolts.

4. In a pivot connection of the class described, the combination of a member having a cylindrical opening therethrough, a pivot pin received therein, said pivot pin being substantially circular in cross-section and having a longitudinally extending tapered portion and a pair of curved bushing members adapted to take up the clearance between the tapered portion of said pin and said cylindrical opening and having cylindrical outer surfaces adapted to fit the inner surface of said cylindrical opening and having tapered inner surfaces adapted to fit the tapered portion of the pin, said pair of curved bushing members being separated from each other along longitudinally extending lines at substantially diametrically opposed points, and means for adjusting the bushing members along the bolts.

5. In a pivot connection of the class described, the combination of a member having a cylindrical opening therethrough, a pivot pin received therein, said pivot pin being substantially circular in cross-section and having a longitudinally extending tapered portion, a pair of curved bushing members adapted to take up the clearance between the tapered portion of said pin and said cylindrical opening and having cylindrical outer surfaces adapted to fit the inner surface of said cylindrical opening and having tapered inner surfaces adapted to fit the tapered portion of the pin, said pair of curved bushing members being separated from each other along longitudinally extending lines at substantially diametrically opposed points, means for adjusting the bushing members along the bolts, means forming an axial opening through one end of the pivot pin forming a lubricating passage, and means forming radially extending communicating lubricating passages within said pin transversely thereof.

WILLIAM N. HALLANGER.